Oct. 9, 1973  A. D. PHILLIPS  3,764,394

WET CELL LANTERN BATTERY

Filed Nov. 5, 1971  2 Sheets-Sheet 1

Oct. 9, 1973  A. D. PHILLIPS  3,764,394

WET CELL LANTERN BATTERY

Filed Nov. 5, 1971  2 Sheets-Sheet 2

United States Patent Office 3,764,394
Patented Oct. 9, 1973

3,764,394
WET CELL LANTERN BATTERY
Albert D. Phillips, P.O. Box 1, Clarksville, Ark. 72830
Filed Nov. 5, 1971, Ser. No. 196,167
Int. Cl. H01m 1/02, 1/08
U.S. Cl. 136—166     4 Claims

ABSTRACT OF THE DISCLOSURE

An enclosure for a small wet cell battery of the type utiilzed on lightweight vehicles, such as motorcycles, is provided and the enclosure defines a substantially sealed structure for an associated battery. The enclosure includes a generally rectangular top wall having upstanding terminals secured therethrough at points spaced along the center line of the top wall and specially contoured connecting straps or brackets are connected and extend between the inner ends of the top wall terminals and the battery posts of the battery within the enclosure. Further, the top wall includes depending cylindrical open bottom wells whose lower ends seat tightly against the top of the associated battery about the fill openings formed therethrough with the removable plugs for the fill openings projecting upwardly into the wells of the top wall. In addition, one end of the enclosure interior defines a vent well disposed exteriorly of the battery receiving cavity within the enclosure and the vent well is closed by the top wall of the enclosure, the top wall including a small diameter vent opening communicating with the upper end of the well and an upper portion of the interior of the well being communicated with a specially provided vent opening in the top of the battery disposed within the enclosure.

---

The battery of the instant invention has been specifically designed to provide a long lasting battery and a battery which may be readily recharged repeatedly and by conventional automotive type battery chargers which many people presently own and are readily available at low cost to those persons who do not own such battery chargers.

Another object of this invention is to provide a lightweight wet cell battery specifically adapted to be utilized in lieu of dry cell batteries of the type which have been specifically-designed as a base for electric lanterns provided with mounting plates telescopingly engageable downwardly over the top portions of dry cell batteries and securable to the associated dry cell battery by means of threaded battery terminal fasteners whereby these fasteners not only serve to electrically connect the light source of the lantern with the battery but also to mount and secure the lantern base on the battery.

Still another object of this invention is to provide a wet cell battery in accordance with the preceding objects and constructed in a manner whereby moderate tilting of the battery from its normal horizontal position will not result in the electrolyte within the battery being spilled outwardly of the outer enclosure of the battery.

A further object of this invention is to provide a battery in accordance with the preceding objects which may be readily worn on a user's belt.

Another important object of this invention is to provide a battery that may have the electrolyte level checked from the exterior of the battery merely by looking through a window provided for the purpose in the outer enclosure of the battery.

A final object of this invention to be specifically enumerated herein is to provide a battery which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part thereof, wherein like numerals refer to like parts throughout, and in which:

Figure 3:
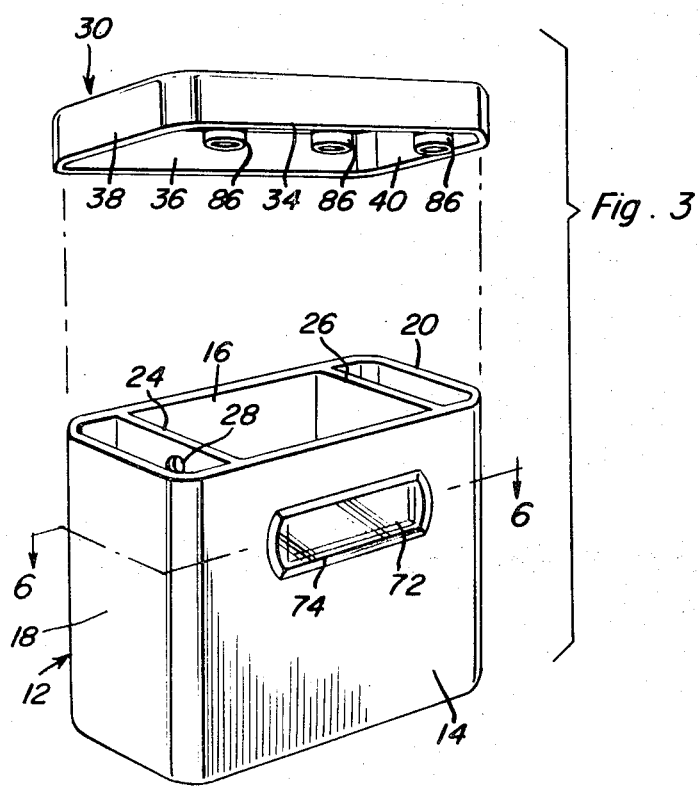
FIG. 3 is an exploded perspective view of the outer enclosure of the battery.

Referring now more specifically to the drawings, the numeral 10 generally designates the battery assembly of the instant invention. The assembly 10, with attention invited more specifically to FIG. 3 of the drawings, includes an outer battery enclosure referred to in general by the reference numeral 12. The enclosure 12 includes upstanding front and rear walls 14 and 16 interconnected by means of upstanding opposite side walls 18 and 20. In addition, a bottom wall 22 extends between the lower marginal edge portions of the walls 14, 16, 18 and 20 to close the bottom end of the enclosure 12.

The interior of the enclosure includes a pair of opposite side partition walls 24 and 26 extending in front to rear direction a spaced distance inward of the side walls 18 and 20 and the upper marginal portion of the partition 24 includes a vent opening 28. Further, the enclosure 12 includes a top assembly referred to in general by the reference numeral 30 including a top wall 32 and peripherally extending and downwardly projecting front and rear skirts 34 and 36 as well as opposite side skirts 38 and 40. The top wall 32 has a small diameter vent opening 42 formed in the end thereof adjacent the skirt 38 and a pair of longitudinally spaced openings or bores 44 and 46 formed therethrough at points spaced longitudinally along the center line of the top wall 32.

The battery assembly 10 further includes a wet cell battery referred to in general by the reference numeral 48 and the battery 48 includes a closed case 50 snugly receivable within the chamber 52 defined between the partitions 24 and 26. The case 50 includes a top wall 52 upwardly through which a pair of apertured terminal posts 54 and 55 project. In addition, the top wall 52 has a plurality of upstanding threaded fill openings 56 formed therethrough in which threaded fill plugs 58 are removably secured.

The foregoing description of the battery 48 may be considered as substantially conventional. The battery 48 differs from most conventional wet cell batteries in that the case 50 is constructed of transparent material and the top wall 52 has been provided with a vent bore 60 including an upper counterbore in which a right angle vent fitting 64 has been secured. Of course, the case 50 has conventional plate sets 66 disposed therein as well as electrolyte 68 filled to the level 70.

The front wall 14 of the enclosure 12 is provided with an opening 72 over which a transparent window 74 has been secured and the opening 72 is in general horizontal registry with the level 70 whereby the level 70 may be viewed through the window 74 whenever desired. In addition, the rear wall 16 of the enclosure 12 has vertically elongated belt loops 78 secured thereto whereby the enclosure 12 may be supported from the belt of the user.

The space between the partition 24 and the side wall 18 defines an acid void or well 80 and inasmuch as the under surface of the top wall 32 abuts the upper end edges of the walls 14, 16 and 18 as well as the partition 24, the top wall 32 closes the upper end of the acid void or well 80. However, the vent opening 28 is disposed above the level of the top wall 52 and a flexible tube 82 has one end telescoped over the vent fitting 64 and the other end secured in the opening 28 whereby the interior of the battery case 50 is vented directly to the well 80 which may be filled with acid resistant but absorbent material 84. Still further, the top wall 32 includes a plurality of upwardly opening and downwardly projecting cylindrical wall defining sleeves 86 and the lower ends of the sleeves 86 abut tightly against the upper surface of the top wall 52 about each of the vent openings 56 and the fill caps or plugs project upwardly into the lower ends of the sleeves 86 whereby they may be removed from above the top wall 32.

Figure 4:
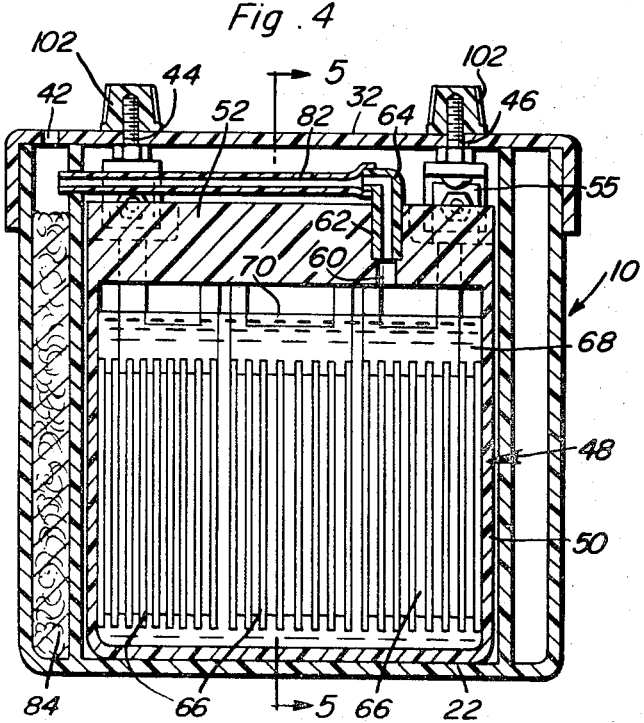
FIG. 4 is an enlarged longitudinal vertical sectional view taken substantially upon the plane indicated by the section line 4—4 of FIG. 2.
Figure 5:
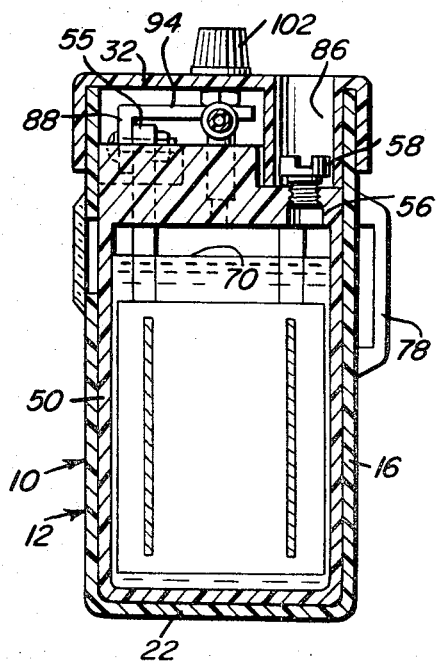
FIG. 5 is a transverse vertical sectional view taken substantially upon the plane indicated by the section line 5—5 of FIG. 4.
Figure 6:
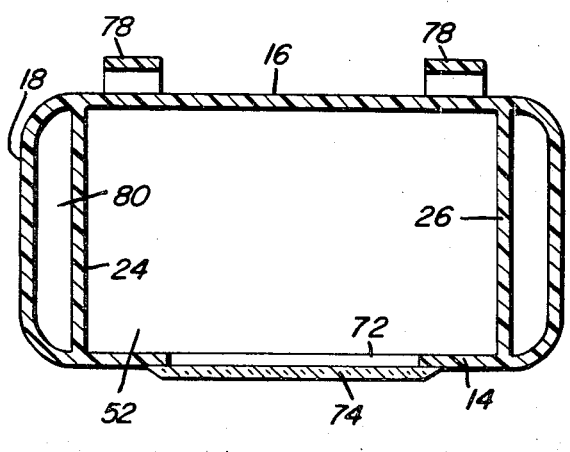
FIG. 6 is an enlarged fragmentary horizontal sectional view taken substantially upon the plane indicated by the section line 6—6 of FIG. 3.
Figure 7:
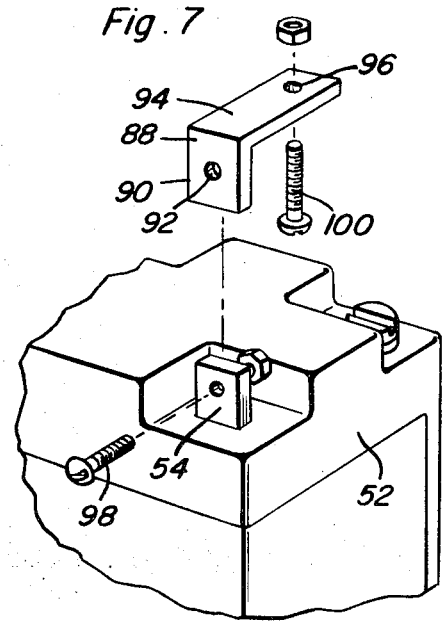
FIG. 7 is a fragmentary perspective view of the upper portion of one end of the battery with the connecting strap and battery terminal as well as the fastener for securing the connecting strap to the battery post illustrated in exploded position.

With attention now invited more specifically to FIGS. 4 and 7 of the drawings, it may be seen that a pair of right angle connecting straps 88 are provided and includes vertical flange portions 90 apertured as at 92 and horizontal flange portions 94 apertured as at 96. Each vertical flange portion 90 is secured to the corresponding battery terminal post by means of a threaded fastener 98 secured to the corresponding battery terminal post and the apertured vertical flange 90 and an upstanding battery terminal in the form of a threaded fastener 100 is secured upwardly through each apertured horizontal flange portion 94 with the fastener 100 projecting upwardly through the apertures or bores 46 and having threaded fasteners or caps 102 threadedly engaged therewith.

Figure 1:
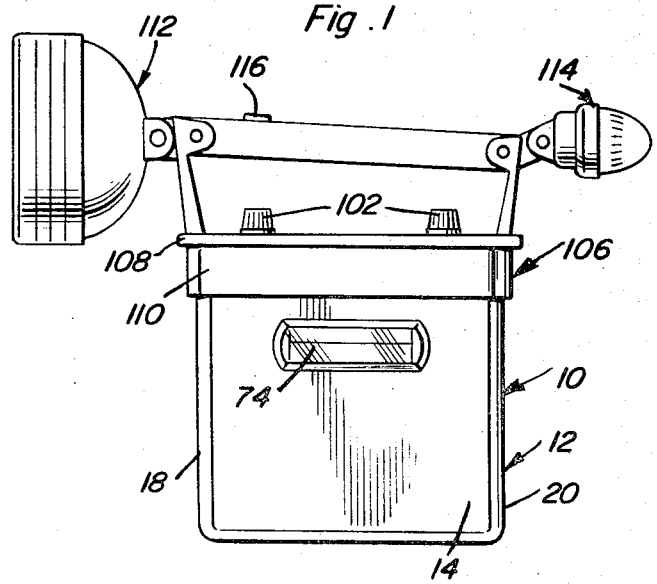
FIG. 1 is a side elevational view of the battery of the instant invention with a lantern assembly mounted atop the battery and secured thereto by the threaded terminal caps for the battery.
Figure 2:
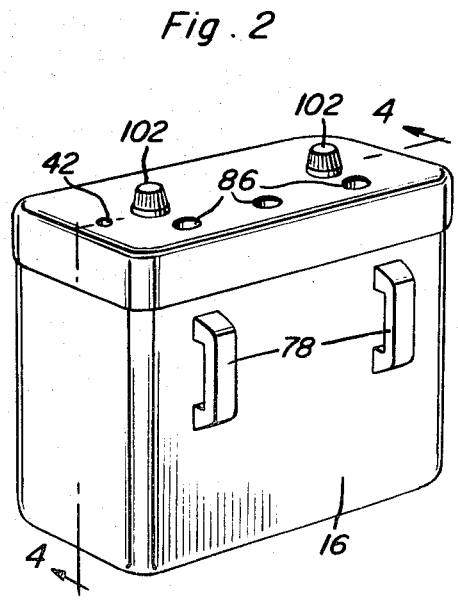
FIG. 2 is an enlarged perspective view of the battery as seen from the rear thereof.

As may best be seen from FIG. 1 of the drawings, a lantern assembly referred to in general by the reference numeral 106 is illustrated. The assembly 106 includes a mounting plate 108 including depending peripheral skirt portions 110 whereby mounting plate 108 may be placed downwardly upon the upper surface of the top wall 32 after the caps 102 have been removed and with the skirt portions 110 closely embracing the skirts 34, 36, 38 and 40 of the top assembly of the enclosure 12. The mounting or base plate 108 has openings formed therethrough and the fasteners or terminals 100 are received upwardly through these openings and secured thereto by means of the caps 102. The mounting of the lantern assembly 106 on the battery assembly 10 in this manner automatically electrically connects the terminals or fasteners 100 with the light assemblies 112 and 114 of the lantern assembly 106 which may be selectively actuated by means of the handle mounted switch 116 of the lantern assembly 106.

In operation, after the battery 48 has been placed within the compartment or well 52 between the partitions 24 and 26, the top or top assembly 30 of the enclosure 12 may be secured in place with the terminals 100 projecting upwardly through the bores or openings 44 and 46 and the lower ends of the sleeves 86 telescoped downwardly over the fill plugs 58 and abutted tightly against the upper surface portions of the top wall 52 disposed about the fill openings 56. After the top 30 has been secured in place in any convenient manner so as to exclude the entrance of air or moisture into the enclosure 12, the lantern assembly 106 may be mounted atop the battery assembly 10 by removal of the caps 102, placement of the base plate 108 downwardly over the top wall 32 of the enclosure 12 and the repositioning of the caps 102 in threaded engagement with the terminals or fasteners 100 so as to clamp the mounting plate 108 to the top 32 of the enclosure 12. In this manner, the lantern assembly 106 is automatically electrically connected to the terminal posts 54 and 55 of the battery 48. Further, the level 70 of electrolyte 68 within the battery 48 need be readily observed through the window 74 of the enclosure 12 and if it becomes necessary to add water to the battery 48, it is merely necessary to downwardly insert an appropriate tool into the sleeves 86 in order to remove the filler plugs 58. After the desired quantity of water has been added to the cells of the battery 48, the plugs 58 may be again placed in position. If continued operation of the lantern assembly 106 causes gas to be formed within the battery 48 above the level 70, this gas is vented from the interior of the battery 48 through the vent fitting 64 and the tube 82 into the acid void or well 80 and absorbed by the material 84. Of course, inasmuch as the acid void or well 80 is in direct communication with the interior of the battery 48 through the tube 82, any gas produced by the battery 48 is not lost to the ambient atmosphere, except in extreme conditions wherein excess gases are vented to the ambient atmosphere to the bore 42 formed in the top wall 32. Of course, because of the manner in which the battery 48 is sealed other than the vent fitting 64, tilting of the battery 48 from a horizontal upright position does not result in electrolyte 68 from within the battery 48 being discharged outwardly of the battery 48.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A battery assembly including a closed hollow case having two pairs of opposing opposite side walls interconnected by means of top and bottom walls, electrode plates disposed in said case and including a pair of electrode terminal posts projecting upwardly through said top wall, said top wall having a vent opening formed therethrough and also at least one filler opening formed therethrough, a removable closure member for said filler opening, a closed outer housing including first and second pairs of upstanding opposite side walls interconnected at their upper and lower ends by means of top and bottom panels extending therebetween, an upstanding partition extending between one pair of housing opposite side walls and top and bottom panels a spaced distance inwardly of but adjacent one wall of the other pair of side walls of said housing defining a closed well within said housing between said partition and said one wall, means establishing closed communication between said vent opening and said well, said housing top panel including a vent opening formed therethrough in the portion thereof closing and defining the upper extremity of said well, a quantity of acid resistant absorbent material disposed in said well, a pair of upstanding terminal post extensions secured through said top panel and electrically connected at their lower end portions to the upper portions of said terminal posts projecting above said top wall, said top panel including a downwardly projecting tubular well opening upwardly through said top panel and downwardly toward and tightly seated against the upper surface of said case top wall about said filler opening, said closure member being removable upwardly through said tubular well, the interior of said housing, exclusive of said well, being substantially closed to the ambient atmosphere.

2. The combination of claim 1 wherein one wall of said one pair of walls of said housing includes a transparent window and the wall of said case inwardly of the last mentioned housing wall is constructed of transparent material and defining a desired level of electrolyte in said case generally registered with said window.

3. The combination of claim 2 wherein the other wall of said one pair of walls of said housing including a pair of outstanding belt receiving loops whereby said housing may be supported from the belt of the user of the battery.

4. The combination of claim 1 wherein the outer housing is generally rectangular in plan shape and its dimensions are such to enable the downwardly opening support base of a lantern assembly to be seated thereagainst and telescoped downwardly thereover, said terminal extension means including portions projecting upwardly through said top panel of said housing and being spaced apart along the longitudinal center line of said top panel and spaced from the ends thereof so as adapted to be received through preformed apertures in the mounting base portion of said lantern assembly.

References Cited

UNITED STATES PATENTS

| | | | |
|---|---|---|---|
| 2,234,673 | 3/1941 | Grierson | 136—170 |
| 2,186,148 | 1/1940 | Raney | 136—170 |
| 3,233,092 | 2/1966 | Umholtz | 136—166 |
| 2,213,428 | 9/1940 | Heise et al. | 136—166 |
| 1,230,390 | 6/1917 | Flanders | 136—177 |
| 2,331,450 | 10/1943 | Baum | 136—179 |

FOREIGN PATENTS

| | | | |
|---|---|---|---|
| 842,387 | 3/1939 | France | 136—6 |
| 660,083 | 10/1951 | Great Britain | 136—166 |

DONALD L. WALTON, Primary Examiner

U.S. Cl. X.R.

136—177, 179